Figure 7:
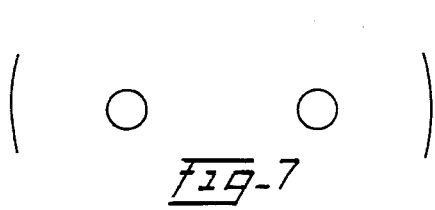

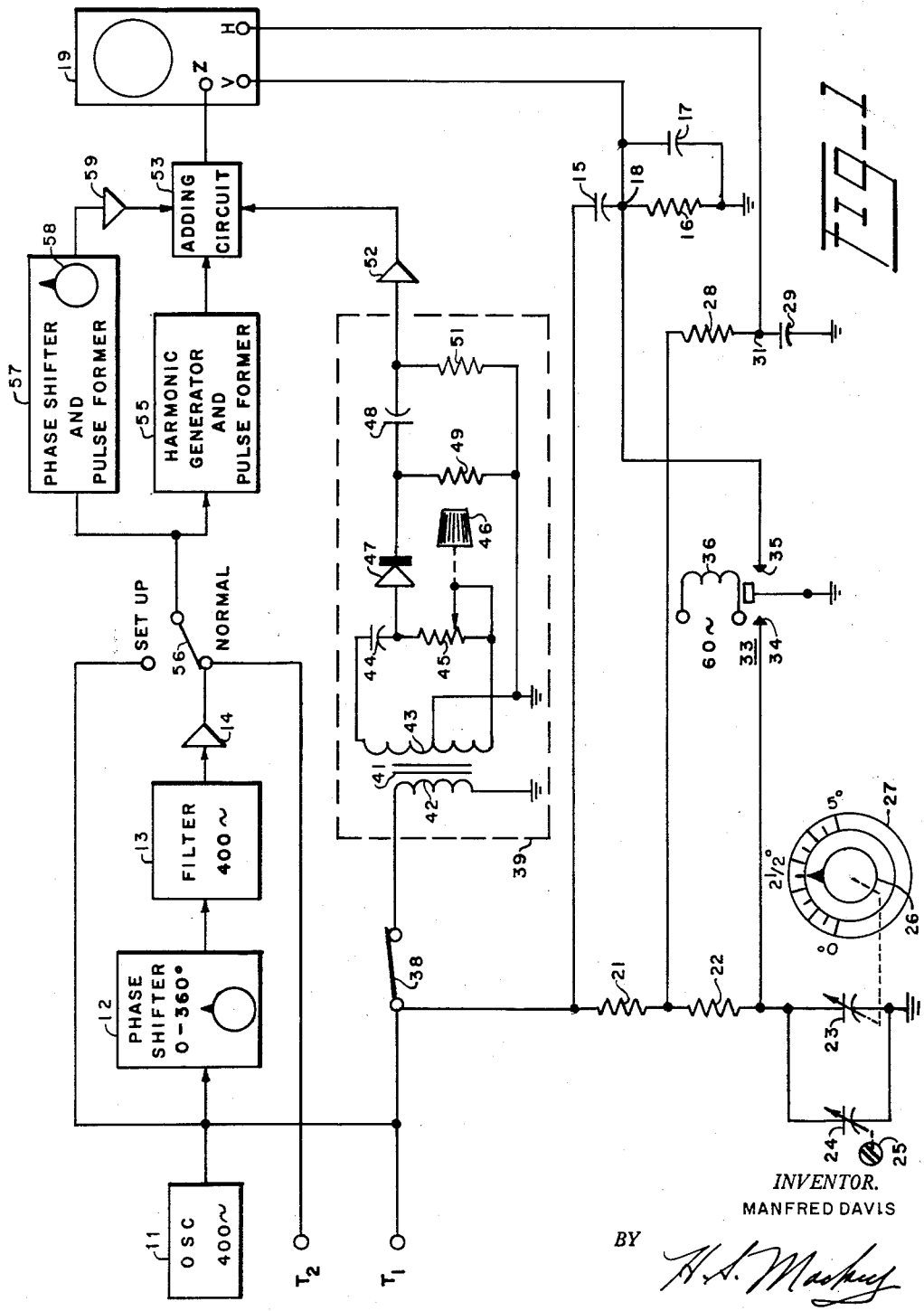

June 6, 1961     M. DAVIS     2,987,675
LABORATORY PHASE STANDARD

Filed Aug. 14, 1958     2 Sheets-Sheet 2

INVENTOR.
MANFRED DAVIS
BY
ATTORNEY

United States Patent Office 2,987,675
Patented June 6, 1961

2,987,675
LABORATORY PHASE STANDARD
Manfred Davis, Brooklyn, N.Y., assignor to General Precision, Inc., a corporation of Delaware
Filed Aug. 14, 1958, Ser. No. 755,019
7 Claims. (Cl. 324—88)

This invention relates to apparatus for measuring the phase angle between two voltages.

There is frequently a need in the laboratory for apparatus which can measure the phase difference between two alternating voltages. Such apparatus may be used for a number of purposes such as for deriving two voltages having any desired phase difference, or for measuring the phase shaft introduced by an item of equipment under test. In the past, phase difference has been measured in various ways, none of which have been entirely satisfactory. For example, the two voltages may be applied to the horizontal and vertical deflection plates respectively of an oscilloscope in which case the ellipticity of the resulting pattern is a measure of the phase angle. Alternatively, both voltages may be displayed simultaneously by using a dual trace oscilloscope or an electronic switch in which case the linear displacement between traces is a measure of phase angle. In either case it is difficult to obtain measurements with an accuracy better than about ±2°.

Another approach is to measure the amplitude of the two voltages and pass them through a multiplying circuit. The amplitude of the product is then proportional to the product of the two amplitudes times the cosine of the phase angle. The accuracy attainable with this method is about the same as with the previously mentioned arrangements.

A more accurate measurement can be obtained by using a calibrated phase shifter. One voltage is passed through the phase shifter which is adjusted to produce a minimum difference between its output and the other voltage. The accuracy obtainable depends upon the accuracy of the phase shifter. It is possible with certain resistance-capacitance phase shifters to obtain accuracies significantly better than one degree but in order to do so the values of the resistors and capacitors and the departures from linearity of the variable resistors must be carefully determined.

A general object of the present invention is to provide apparatus for measuring the phase angle between two alternating voltages.

Another object is to measure the phase angle between two voltages with great accuracy.

Another object is to provide phase angle measuring apparatus the accuracy of which is not limited by the preciseness with which the values of the elements of the apparatus are known.

Another object of the invention is to provide phase angle measuring apparatus with which measurements can be made quickly, easily and accurately.

Another object is to provide phase angle measuring apparatus which operates equally well for all phase angles from zero to three hundred and sixty degrees.

Briefly stated, the objects of the invention are attained by apparatus in which one of the voltages is regarded as a reference voltage from which two voltages in quadrature with each other are derived. These voltages are applied to the horizontal and vertical deflection systems of a cathode ray oscilloscope so as to guide the electron beam around a circular path. The beam is normally suppressed but a pulse forming circuit generates a narrow pulse once each cyle which is applied to the intensity control terminal thus forming a single reference spot near the edge of the screen. The voltage of unknown phase is led to a harmonic generator which generates a large number of sharp pulses for each cycle of the reference voltage and these are also applied to the intensity control terminal, thus causing a circle of spots to appear on the screen. A suitable circuit intensifies one of these and the angular distance between this intensified spot and the reference spot is a coarse measure of the phase angle between the two voltages. A fine measure is obtained by displaying simultaneously the horizontal projection of the circle of spots to a greatly expanded scale. For this display only, the phase of the voltage applied to the horizontal deflection circuit is variable over a small range and this variation causes the spots (which are in line) to move toward and away from each other. The amount of phase shift required to move two of the spots to coincidence is a fine measure of the phase between the reference and the unknown voltages.

For a clearer understanding of the invention reference may be made to the following detailed description and the accompanying drawing in which:

FIGURE 1 is a diagram, partly schematic, partly in block form, of an embodiment of the invention; and FIGURES 2 to 8 inclusive are diagrams showing the relative positions of spots on the oscilloscope screen and are useful in explaining the invention.

FIGURE 1 shows the invention applied to apparatus for generating a voltage having any desired phase with respect to a reference voltage. There is shown an oscillator 11 which serves as a reference voltage and may, for example, generate a frequency of 400 cycles. The output of the oscillator is connected to a variable phase shifter 12 the output of which is passed through a filter 13 tuned to the frequency of the oscillator 11 which in this case is 400 cycles. The output of the filter 13 is amplified by an amplifier 14. The phase shifter 12 need not have a high degree of accuracy and may, for example, comprise an inductive resolver having two mutually perpendicular stator windings excited in quadrature so that a rotating field is set up which links with the turns of the rotatable secondary winding which thus has induced in it a voltage the phase of which depends upon its angular position. The filter 13 is employed in order to reduce to a very low value any harmonic distortion introduced by the phase shifter 12.

The oscillator 11 is also connected to a terminal $T_1$ and the output of the amplifier 14 is connected to a terminal $T_2$. By adjusting the phase shifter 12, the phase of the voltage of terminal $T_2$ can have any desired relationship to that of $T_1$. The difficulty lies in determining the difference accurately.

The oscillator 11 is also connected to a phase shifting circuit comprising a capacitor 15 connected in series with the parallel combination of a resistor 16 and a capacitor 17. The junction 18 of the capacitor 15 and resistor 16 is connected to the vertical deflection circuit of a cathode ray oscilloscope 19.

The oscillator 11 is also connected to ground through a voltage divider comprising the series combination of a resistor 21, a resistor 22 and a small variable capacitor 23, which capacitor may be an air dielectric unit having a capacitance of about 250 $\mu\mu f$. and which may be shunted by the usual trimmer capacitor 24 varied by a screwdriver adjustment 25. The capacitor 23 is adjusted by means of a knob 26 having a pointer which cooperates with a scale 27, as will be more fully explained subsequently. The junction of resistors 21 and 22 is connected to ground through the series combination of a resistor 28 and a capacitor 29. The junction 31 of this latter resistor and capacitor is connected to the horizontal deflection circuit of the oscilloscope 19. The values of the various resistors and capacitors are selected so that the voltages at junctions 18 and 31 are in phase quadrature with each other although their magnitudes may be quite different.

A vibrating switch 33 has a grounded armature which vibrates between two contacts 34 and 35, the former of which is connected to the junction of resistor 22 and capacitor 23 and the latter of which is connected to the junction 18. The operating winding 36 of the switch 33 is connected to a source of alternating current having a frequency low compared to that of the oscillator 11. If the oscillator 11 has a frequency of 400 cycles, the winding 36 may be connected to the 60 cycle line. During the half cycle when the contact 34 is grounded, the voltage of the oscillator is divided by the action of resistors 21 and 22 so that a reduced voltage is applied to the network comprising resistor 28 and capacitor 29. The magnitude of the voltages of terminals 18 and 31 may be considerably different but can be equalized by the internal amplifiers of the oscilloscope 19 so as to generate a circular trace on the screen. When the contact 35 is grounded, the junction 18 is grounded and therefore the vertical deflection voltage is zero. At the same time the voltage at junction 31 will be considerably increased over its former value, preferably on the order of ten or twenty times, because the resistor 22 is no longer connected to ground directly but only through the capacitors 23 and 24 which have a very high impedane at the frequency of the oscillator 11. Thus there is generated a straight line trace which is the horizontal projection of the circular trace to a greatly expanded scale.

The oscillator 11 is also connected through a manually operated switch 38 to a phase shifting and pulse forming circuit 39. The circuit 39 may comprise an input transformer 41 having a primary winding 42 and a secondary winding 43 the center tap of which is grounded. The extremities of the winding 43 are connected to the series combination of a capacitor 44 and a variable resistor 45 which may be adjusted by means of a knob 46. The junction of capacitor 44 and resistor 45 is connected to a rectifier element 47 which suppresses one-half cycle of the applied voltage. The voltage pulse thus produced during the other half-cycle is sharpened by means of a high pass filter comprising a series capacitor 48 and shunt resistors 49 and 51. The pulse output of the circuit 39 is passed through an amplifier 52 to an adding circuit 53 and thence to the intensity control terminal of the oscilloscope 19.

The trace on the oscilloscope 19 is normally suppressed and is brightened only upon application of a voltage to the intensity control terminal. Thus the apparatus so far described will cause merely a single spot of light to appear on the screen since the beam is suppressed except for a brief period once each cycle of the reference voltage.

There is also shown a harmonic generator and pulse former 55 which is connected through a single pole double throw switch 56 either to the amplifier 14 or directly to the oscillator 11. The generator 55 may take various forms, it only being necessary that it multiply the input frequency many times and generate a short pulse once each cycle of the multiplied voltage. In one satisfactory embodiment the generator 55 comprises a frequency tripler followed by a frequency quadrupler and finally a frequency sextupler, the latter triggering a thyratron pulse generator so that a short pulse is formed seventy-two times for each cycle of the input voltage. These pulses are also led to the adding circuit 53 and thence to the intensity control terminal so as to brighten the trace seventy-two times per cycle.

The armature of the switch 56 is also connected to a phase shifting and pulse forming circuit 57 having a phase control knob 58 and which may be identical to the circuit 39 previously described. The output of this circuit is amplified by an amplifier 59 and passed to the adding circuit 53 and the intensity control terminal so that the trace is brightened once each cycle of the voltage appearing on switch 56.

Figure 3:
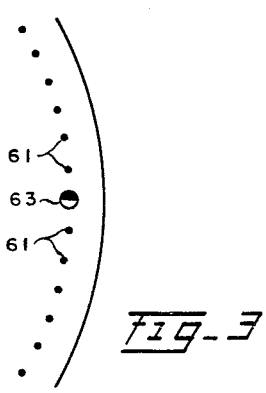

The effect of the various trace brightening pulses can best be understood by considering the set-up procedure preparatory to measuring the phase of the output of phase shifter 12 and amplifier 14. First, the switch 38 is opened and the switch 56 turned to its upper or set-up position so as to apply the reference voltage from oscillator 11 to the circuits 55 and 57. The circuit 55 will then generate seventy-two pulses for each cycle of the voltage applied to the deflection circuit so that there will be a circular pattern of seventy-two light spots five degrees apart. These are shown as the spots 61 in FIGURE 2. The circuit 57 generates one pulse each cycle which in turn produces one spot which is shown as 62 in FIGURE 2. The knob 58 is now turned until the spot 62 coincides with one of the spots 61 so that there is one extra bright spot as shown in FIGURE 3 as spot 63. Next, the switch 38 is closed thereby connecting circuit 39 which generates one pulse per cycle which in turn produces a spot such a spot 64 of FIGURE 4. The knob 46 is now adjusted until the spot 64 coincides with the other bright spot making a very bright spot designated 65 in FIGURE 5.

Figure 6:
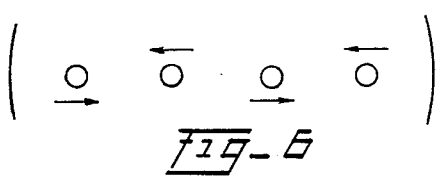

Consider now the horizontal trace as shown in FIGURE 6. The scale is much larger than the horizontal scale in the circular pattern so that only about four spots appear on the screen and in general these will be separate as shown. With the knob 26 at the zero mark of the scale 27, the screwdriver adjustment 25 is turned which will cause the phase of the voltage applied to the horizontal deflection circuit to vary slightly thus causing some of the spots to move to the left and others to the right as shown by the arrows in FIGURE 6. The adjustment 25 is turned until the spots coincide as shown in FIGURE 7.

If the scale 27 has not been marked off previously this may be done now. With the spots coincident, the zero point is established. The knob 26 is now turned causing the spots to separate and finally coincide again at which point the scale is marked 2½°. Further turning causes the spots to again separate and again to coincide, at which point the scale is marked 5°. Suitable markings may be placed at intermediate points by interpolation.

Figure 8:
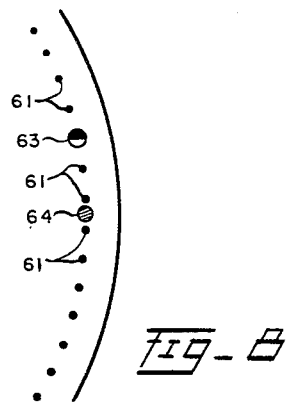
Figure 4:
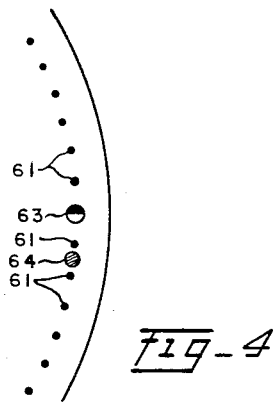
Figure 5:
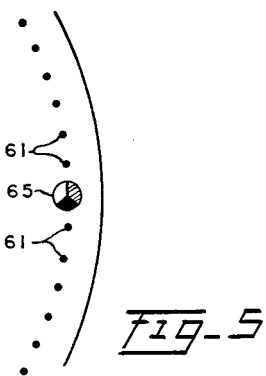
Figure 2:
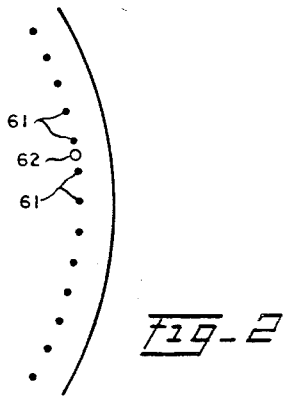

It will be noted that during the above adjustments the switch 56 has been in the "Set Up" position so that the "unknown" voltage was really the reference voltage and the apparatus was adjusted to show zero phase difference. When these adjustments have been completed the apparatus is ready to measure the phase of the output of amplifier 14 and to this end the switch 56 is now turned to the "Normal" position. The phase of the unknown voltage will, in general, be different from that of the reference and accordingly the spots 61 and 63 will be angularly displaced from their former positions and may, for example, appear as shown in FIGURE 8. However, it is noted that the spot 64, generated by the circuit 39, remains stationary in its reference position. Since each spot represents 5°, a rough measure of the phase shift can be determined by counting the number of spots between spots 63 and 64. As shown in FIGURE 8, the phase shift is more than ten but less than fifteen degrees. At this time the straight line trace may be similar to that shown in FIGURE 6 and in order to obtain a fine measure of phase shift the knob 26 is turned until the spots coincide, and the scale 27 is read.

As an example of the sizes of components suitable for the phase shifting and voltage dividing networks the following values have been found satisfactory for use at 400 cycles:

| | | |
|---|---|---:|
| Resistor 16 | ohms | 10,200 |
| Resistor 21 | do | 27,000 |
| Resistor 22 | do | 1,500 |
| Resistor 28 | do | 51,000 |
| Capacitor 15 | μμf | 10,000 |
| Capacitor 17 | μμf | 1,200 |
| Capacitor 23 | μμf | 250 |
| Capacitor 29 | μμf | 2,270 |

The above values are those marked on the components actually used in the specific embodiment. Since ordinary, rather than precision, components were used, it will be understood that the actual values may be somewhat different and in constructing a model a little adjusting or trimming may be necessary to obtain best results.

Although a specific embodiment has been described, many modifications may be made within the spirit of the invention. For example, although generation of the seventy-second harmonic has been described it will be understood that higher harmonics can be used which will enable greater accuracy of measurement to be achieved. Many other modifications will occur to those skilled in the art. It is therefore desired that the invention be limited only by the true scope of the appended claims.

What is claimed is:

1. Apparatus for measuring the phase of an unknown voltage with respect to that of a reference voltage comprising, an oscilloscope, means for causing the beam of said oscilloscope to complete a circular path once each cycle of said reference voltage, means for brightening the trace of said oscilloscope once each cycle of said reference voltage, means for brightening the trace a plurality of times for each cycle of said unknown voltage, means for additionally brightening the trace once each cycle of said unknown voltage, whereby a pattern is generated comprising a plurality of equally spaced light spots arranged in a circle and two additional light spots, cyclically operated switch means for periodically eliminating the vertical excursion of the beam while expanding its horizontal excursion, whereby there is generated simultaneously an additional pattern comprising several light spots arranged in a horizontal line, and means operative only during generation of said line pattern for varying the lateral position of said light spots along said horizontal line.

2. Apparatus for measuring the phase of an unknown voltage with respect to that of a reference voltage comprising, an oscilloscope including horizontal deflection, vertical deflection and intensity control terminals, circuit means connected between said reference voltage and said deflection terminals for applying alternating voltages in phase quadrature with each other to said horizontal and vertical deflection terminals, means for applying to said intensity control terminal a voltage having three components, a first component being a short pulse once each cycle of said reference voltage, a second component being a short pulse once each cycle of said unknown voltage, and a third component being a plurality of short pulses each cycle of said unknown voltage, whereby said oscilloscope exhibits on its screen a pattern comprising a plurality of light spots evenly distributed around the circumference of a circle and two additional light spots also on the same circumference, switch means operated cyclically at a rate which is low compared to the frequency of said reference voltage for removing the voltage from said vertical deflection terminal and increasing the voltage applied to said horizontal deflection terminal whereby said oscilloscope exhibits an additional pattern on its screen comprising a plurality of light spots arranged in a horizontal line, and means operative only during the generation of said line pattern for varying the phase of the voltage applied to said horizontal deflection terminals.

3. Apparatus for measuring the phase of an unknown voltage with respect to that of a reference voltage comprising, an oscilloscope having horizontal deflection, vertical deflection and intensity control terminals, means for deriving from said reference voltage two voltages in phase quadrature with each other and for applying said two voltages to said horizontal and vertical deflection terminals, means for generating a short pulse once each cycle of said reference voltage and for applying said pulse to said intensity control terminal, means for generating a plurality of pulses for each cycle of said unknown voltage and for applying said pulses to said intensity control terminal, means for increasing the amplitude of one of said pulses, whereby there is displayed on said oscilloscope a pattern comprising a plurality of light spots arranged in a circle, cyclically operated switch means for reducing the voltage on said vertical deflection terminal to zero and increasing the voltage on said horizontal deflection terminal, whereby there is also displayed a pattern comprising several light spots arranged in a straight line, and means operable only during the display of said straight line pattern for varying the phase of the voltage applied to said horizontal deflection terminal.

4. A circuit for deriving voltages for the deflection circuits of an oscilloscope from an alternating current source comprising, a first phase shifting circuit having its input connected to said source and its output adapted to be connected to one deflection circuit of said oscilloscope, an impedance having one extremity connected to said source, a second phase shifter having its input connected to an intermediate point on said impedance and its output adapted to be connected to the other deflection circuit of said oscilloscope, and cyclically operated switch means for alternately closing a first and opening a second contact or closing said second and opening said first contact, closure of said first contact completing a circuit from the other extremity of said impedance to said source, closure of said second contact short circuiting the output of said first phase shifter.

5. A circuit for deriving voltages for the deflection circuits of an oscilloscope comprising, an alternating current source having first and second terminals, a first phase shifting circuit having its input connected to said terminals of said source and its output adapted to be connected to one deflection circuit of said oscilloscope, an impedance having one extremity connected to said first terminal of said source, a second phase shifter having its input connected to an intermediate point on said impedance and to said second terminal and its output adapted to be connected to the other deflection circuit of said oscilloscope, and cyclically operated switch means for alternately closing a first and opening a second contact or closing said second and opening said first contact, closure of said first contact completing a circuit from the other extremity of said impedance to said second terminal of said source, closure of said second contact short circuiting the output of said first phase shifter, said phase shifters having such values of parameters that their outputs are in phase quadrature with each other when said first contact is closed.

6. Apparatus for measuring the relative phase of a pair of voltages comprising, an oscilloscope including horizontal and vertical deflection circuits, means connected to said horizontal and vertical deflection circuits and operated by one of said pair of voltages for generating a circular trace on said oscilloscope, means operated by said one of said pair of voltages for intensifying the beam of said oscilloscope once each cycle of said one voltage, means operated by the other of said pair of voltages for intensifying the beam of said oscilloscope once each cycle of said other voltage, means operated by said other voltage for intensifying the beam of said oscilloscope a plurality of times during each cycle of said other voltage, means for periodically grounding one of said deflection circuits and simultaneously increasing the voltage applied to the other of said deflection circuits, and means operative only during the application of the increased voltage to said other deflection circuit for varying the phase of the voltage applied thereto.

7. Apparatus for measuring the relative phase of first and second voltages comprising, an oscilloscope including a cathode ray beam intensifying circuit and horizontal and vertical deflection circuits, means connected to said horizontal and vertical deflection circuits and operated by said first voltage for generating a circular trace on said oscilloscope, means operated by said first voltage for generating therefrom a sharp pulse once each cycle of said first voltage, means operated by said second voltage for generating therefrom a sharp pulse once each cycle of said second voltage, means operated by said second voltage for generating a sharp pulse at least eighteen times during each cycle of said second voltage, means for applying all of said pulses to said intensifying circuit of said oscilloscope, switch means operated cyclically at a rate which is low compared to the frequency of said first and second voltages for periodically grounding one of said deflection circuits and for simultaneously increasing the voltage applied to the other of said deflection circuits, and means operative only during the application of the increased voltage to said other deflection circuit for varying the phase of the voltage applied thereto.

References Cited in the file of this patent

UNITED STATES PATENTS

| | | |
|---|---|---|
| 2,178,074 | Jakel | Oct. 31, 1939 |
| 2,374,817 | Hardy | May 1, 1945 |
| 2,408,414 | Donaldson | Oct. 1, 1946 |
| 2,546,407 | Rich | Mar. 27, 1951 |
| 2,552,022 | Watson et al. | May 8, 1951 |
| 2,589,773 | Chance et al. | Mar. 18, 1952 |
| 2,614,221 | Moll | Oct. 14, 1952 |
| 2,768,323 | Schonover | Oct. 23, 1956 |
| 2,874,352 | Durbin | Feb. 17, 1959 |

OTHER REFERENCES

"Modulated Beam Cathode Ray Phase Meter," article in Proceedings of the I.R.E., May 1944; pages 268–272.

"A Cathode Ray Tube Frequency Comparator for 1 kc. Sub-Standard Tones," article in The Post Office Electrical Engineers Journal, July 1949; pages 61–64.

"A Versatile Phase Angle Meter," article in Electronic Engineering, May 1952; pages 224—229.